July 9, 1968

R. D. TOWNSEND, JR 3,391,734

SUBSEA PRODUCTION SATELLITE

Filed Jan. 19, 1966

INVENTOR
ROBERT D. TOWNSEND, JR.

ATTORNEY

INVENTOR
ROBERT D. TOWNSEND, JR.

ATTORNEY

INVENTOR
ROBERT D. TOWNSEND, JR.

ATTORNEY

July 9, 1968   R. D. TOWNSEND, JR   3,391,734
SUBSEA PRODUCTION SATELLITE
Filed Jan. 19, 1966

INVENTOR
ROBERT D. TOWNSEND, JR.

ATTORNEY

United States Patent Office 3,391,734
Patented July 9, 1968

3,391,734
SUBSEA PRODUCTION SATELLITE
Robert D. Townsend, Jr., Esher, Surrey, England, assignor to Mobil Oil Corporation, a corporation of New York
Filed Jan. 19, 1966, Ser. No. 521,745
23 Claims. (Cl. 166—.5)

ABSTRACT OF THE DISCLOSURE

This specification discloses a subsea production satellite having a watertight shell with integral wellhead cylinders extending vertically therethrough. After the satellite is leveled on a marine bottom, wells are drilled through the satellite wellhead cylinders and the casings hung therein. The wells are controlled and produced directly into the satellite through ports in the walls of the wellhead cylinders within the satellite.

---

This invention relates to a subsea production satellite system, having the satellite therefor anchored beneath the surface of a body of water at the site of a plurality of submerged wells. More particularly, the invention relates to a subsea production satellite having a travel chamber for transporting personnel between the surface and the satellite and having the wellheads for the plurality of submerged wells extending through the interior of the satellite with the control valves for the wellheads being within the satellite.

Until now, bottom-supported above-surface platforms have been the principal mechanism for the installation and support of the equipment and services necessary for the exploitation of subaqueous mineral fields. As the industry has developed over the years, it has extended its search for offshore fluid mineral deposits, for the most part, oil and gas from its birthplaces in the shallow coastal waters of California and the Gulf of Mexico into areas where, because of excessive water depth or other local conditions, the bottom-supported platform is neither as economically nor technologically feasible as in the Gulf of Mexico, where such facilities are rather commonplace. For purposes of this disclosure, the term "fluid minerals" is to be construed broadly to include minerals, such as gas and/or oil and also minerals adaptable to being mined by means of slurries, solvents or any other similar states that may be transported through a production passage in a well and/or flowlines.

While, theoretically, there is no limit to the depth for which a bottom-supported platform can be designed and installed, experience to date indicates that platform costs increase exponentially with increase in water depth. Thus, the presently estimated costs of a platform to carry the production facilities for a field in three to four hundred feet of water or more are so high as to indicate that such an installation cannot be justified economically for any but a very productive and prolific field. Furthermore, the few bottom-supported above-surface platforms that have been designed and built for use in three hundred feet or more of water depth have invariably suffered leg failures of one type or another.

One solution is the installation of the production facilities on a floating platform, which could be maintained on location in the field by either a fixed multipoint mooring system of anchors and anchor lines or by a dynamic positioning system. The above-proposed solution requires continual maintenance and surveillance of the locating system, as well as the associated problems and expense of maintaining the multiple flexible hoses connecting the wells on the sea bottom with the continuously moving floating production platform, and the potential hazard to the hoses in the event of a failure of either the fixed mooring or dynamic positioning or locating systems.

In many areas of the world, local conditions other than water depth impose critical limitations on the use of bottom-supported production platforms. One such area is the Arctic, as exemplified by the Cook Inlet in Alaska, where a bottom-supported platform must be built to withstand the forces imposed by thick ice layers that form on the water surface during the winter months of the year. While any above-surface production platform is subject to the mercy of the wind and waves, especially those occurring during hurricanes and other violent storms, in the Arctic areas, these forces due to wind and waves can be exceeded by the forces exerted against the platform by the movement of the thick ice layers on the surface of the water. This is particularly true of an area such as the Cook Inlet, in which the local condition of extremely high tidal movements, of the order of thirty feet or more, causes very fast tidal currents in the Inlet, with velocities up to eight miles per hour or more. These very rapid currents carry with them broken up sections of the thick ice layers that form on the surface of the Inlet, so that ice bears with tremendous force against any fixed structure, such as a bottom-supported or floating surface production platform, that should be installed in its path.

In still other areas, it is not adverse natural but manmade conditions which restrict the use of above-surface production platforms. Among such conditions could be listed official and/or public objections to oil production facilities near public recreational or residential areas, or the presence of heavy marine traffic, as in harbors, channels, rivers, or other navigable bodies of water, which may make it necessary or advantageous to install as much of the production equipment below the water surface as possible. Although the term "sea" is used hereafter to denote the body of water in which the satellite system is used, it is meant to encompass any open ocean, coastal, inland, or offshore area. If economically feasible, such a design would be used even in sheltered bays and large lakes, such as Lake Maracaibo in Venezuela.

It is, of course, technically possible to so modify and package the typical production equipment used for scheduling, measuring, testing, and otherwise performing the usual manipulations required on producing oil and gas wells, so that it could be installed below the water surface. Such packaging and modifying has already been accomplished, to a very limited extent for the much simpler problem of the wellhead for the subaqueous production of a gas or oil well. However, the cost has been quite high, usually doubling or tripling the expense of the underwater wellhead over its comparable above-water counterpart, because of the need to protect against the inimical undersea environment. Further, the problems of performing the necessary, if limited, service and maintenance on this submerged equipment are substantial. Men cannot work as efficiently under water, where they are subject to the encumbrances of diving gear and the physiological problems of working under and breathing in the much higher than normal atmospheric pressures. Attempts have been made to replace man in this hostile environment by use of robotics, but these devices, at the present stage of their development, can only perform simple chores, and the cost of maintenance of the devices, themselves, is high. Further, they depend, for their efficiency of operation, on the effective use of underwater television, so that in turbid or muddy waters, where television is not effective, the robotic devices become almost useless. Thus, when all of the above disadvantages are considered with respect to the installation of complicated well testing and production equipment on the ocean floor, it can be seen that while perhaps such is technically feasible, it is only just barely so, and most certainly falls beyond the bounds of being economically feasible for all save a few very special situations.

Accordingly, it is an object of this invention to provide a subsea satellite for handling the production of a number of subaqueous wells at an offshore site.

It is another object of this invention to provide a subsea satellite having a travel chamber for transporting personnel between the surface and the satellite.

It is a further object of the invention to provide a subsea satellite which may be serviced without a diver or remote control devices.

Other objects and advantages of this invention will become readily apparent from the following description, when taken in conjunction with the accompanying drawings that illustrate useful embodiments in accordance with this invention.

Figure 1:
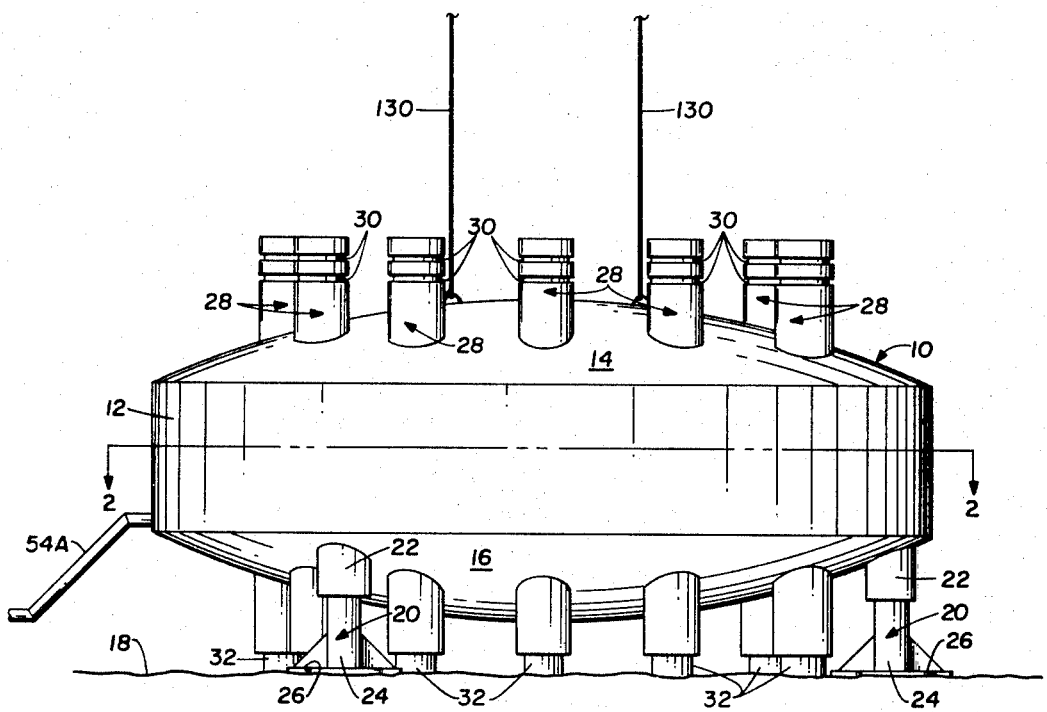
FIGURE 1 is an elevational view of a subsea satellite of the present invention encompassing a circular configuration of subsea wellheads which extend therethrough.

The subsea satellite of the present invention is a watertight pressure-resistant vessel installed on the sea bottom. It consists of a fabricated shell, of a shape and design adequate to withstand the hydrostatic head of the water at the depth that it is intended to be installed. An oblate spheroid, or a cylinder with spherical heads, would be optimum shapes for this requirement. Three or more extensible hydraulic leveling units are equiangularly spaced around the inside of the shell of the satellite and extend down through the lower portion thereof to support it during installation. Each of the leveling units is fitted with a large base plate to provide a bearing surface on the floor of the sea. A plurality of cylindrical wellheads extend completely through the fabricated shell and for convenience and optimum spacing, are usually formed in concentric circles around the central axis of the circular satellite. Although a plurality of wellhead cylinders are closely grouped within the satellite, the satellite will, of course, service a large area through the use of the common expedient of directional wells. The wellheads are welded in or in any other way permanently sealed in place prior to placing the satellite in the water so that a hollow central passage through each of the wellheads is open at both ends prior to drilling a well therethrough, but no water may enter the satellite itself. The upper end of each wellhead cylinder, outside of the satellite shell, has grooves machined therein so that it can be connected to further equipment by means of a hydraulically operated lock gate, or one of several proprietary remotely controlled or automatic connectors available, as described later.

A cylindrical access trunk extends through the shell of the subsea satellite, the access trunk being open to the sea at its upper end. It is adapted to hold a travel chamber designed to transport personnel between a surface station, such as a service vessel or platform, and the interior of the subsea satellite. The travel chamber is a watertight pressure-resistant vessel sealable in the upper end of the access trunk so that after the travel chamber is in the trunk, and the pressure in the now enclosed trunk equalized, personnel are able to gain entrance to the subsea satellite without a diving suit. Normally the travel chamber operates on guide lines, held taut between the surface station and the subsea satellite, and is hoisted to the surface by a wire line from above.

The satellite is installed, prior to the drilling of any wells, by first lowering it to the marine floor and leveling it by means of the above-mentioned hydraulic leveling units. Once the satellite is leveled, a conductor pipe for each of the wells is drilled or jetted into the bottom through the respective wellhead cylinder and is locked in place from within the satellite shell by personnel therewithin. Once at least three spaced conductor pipes have been fixed with respect to the wellhead cylinders, the satellite is permanently positioned. The leveling units are then no longer necessary and may be permanently retracted.

After the conductor pipes have been set, the wells may be drilled from either a jack-up type mobile unit or a floating drilling vessel. If the jack-up type mobile unit is used, a riser pipe is removably connected to the respective wellhead cylinder by the remote control locking means coacting with the grooves in the upper end of the cylinder. After the connection is made, a BOP (blowout preventer) assembly is mounted on the top of the riser at the level of the cellar deck of the drilling platform above the surface and the drilling of a well through the wellhead cylinder may commence. If a floating drilling vessel is used to drill the well, the BOP assembly is removably connected directly to the respective wellhead cylinder by the remote control locking means. After the connection is made, a low pressure riser is removably connected to the top of the BOP assembly and extends to the cellar deck of the floating drilling vessel above.

The wellhead cylinders are so designed that the necessary casings can be hung therewithin as drilling progresses. Each of the casings and tubings must in turn be locked into its wellhead cylinder by the personnel within the satellite once it has been lowered into place through the riser pipe from above. As each of the strings of pipe is set, including the conductor, the casing, and the production tubing, an upper mandrel head thereon is locked and sealed into place to make a fluidtight, permanent connection. After completion, the BOP and riser pipe are removed and a permanent wellhead cap is mounted atop the respective wellhead cylinder. Personnel within the satellite connects the wellhead cylinder to a manifold within the satellite for production of oil and/or gas therethrough from the completed well.

The interior of the satellite, as illustrated, is fitted with the equipment necessary to perform the normal production functions, when producing an oil and/or gas field, such as periodically gauging production of individual wells, separating produced gas and oil, boosting produced oil and gas from the satellite to central production facilities, distributing artificial lifting energy from the central production facilities to the individual wells, and the remotely controlling, adjusting, and performing of minor repair operations on the individual wells. Most of the equipment installed to perform these various functions will be similar to that used for the same functions in conventional onshore operations, with necessary modifications, miniaturization, and automation to adapt it to the limited confines and substantially unattended operation of the subsea satellite. Furthermore, the satellite is connected by a bundle of shipping lines, electric lines, and communication cables to the central production facilities to provide for the shipping of produced oil, water (and wastes), and gas, and for the transmitting of informational data to the central production facilities; and for receiving at the satellite from the central production facilities, the necessary control information, electrical energy, and artificial lift energy for the operations to be performed.

Now looking at FIGURE 1, which shows a bottom-installed satellite connected to wells therebeneath, a torus-shaped subsea production satellite, generally designated 10, is illustrated as a cylindrical shell 12 with upper and lower spherical heads 14 and 16, respectively. The satellite 10 is supported on the marine bottom 18 by means of leveling units, generally designated 20, each comprising an expansible chamber motor cylinder 22, extending through the lower spherical head 16, and a downwardly directed piston rod 24 terminating in a platelike foot 26. A plurality of wellhead cylinders, generally designated 28, extend vertically completely through the satellite 10 and have spaced circumferential grooves 30 on the outer surface of each near the upper ends thereof above the shell of the satellite 10. The cylinders 28 are welded to the upper and lower heads 14 and 16, respectively, so that the interior of the satellite remains watertight at all times. A conductor pipe 32, permanently fixed in each of the wellhead cylinders 28, depends therefrom, bridging the space between the satellite and the sea bottom and extends vertically into the formations beneath.

Figure 2:
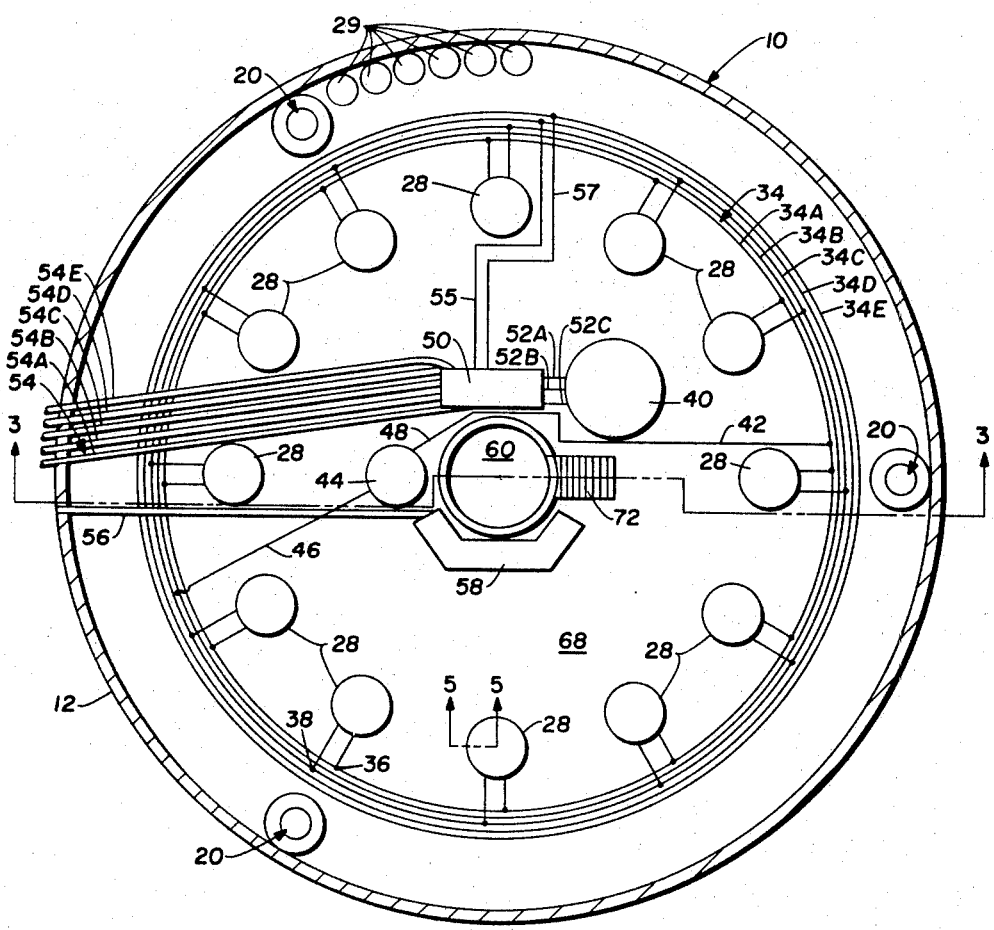
FIGURE 2 is a schematic view through line 2—2 of FIGURE 1 showing, in plan, a diagrammatic representation of the placement of the production apparatus within the subsea satellite.
Figure 3:
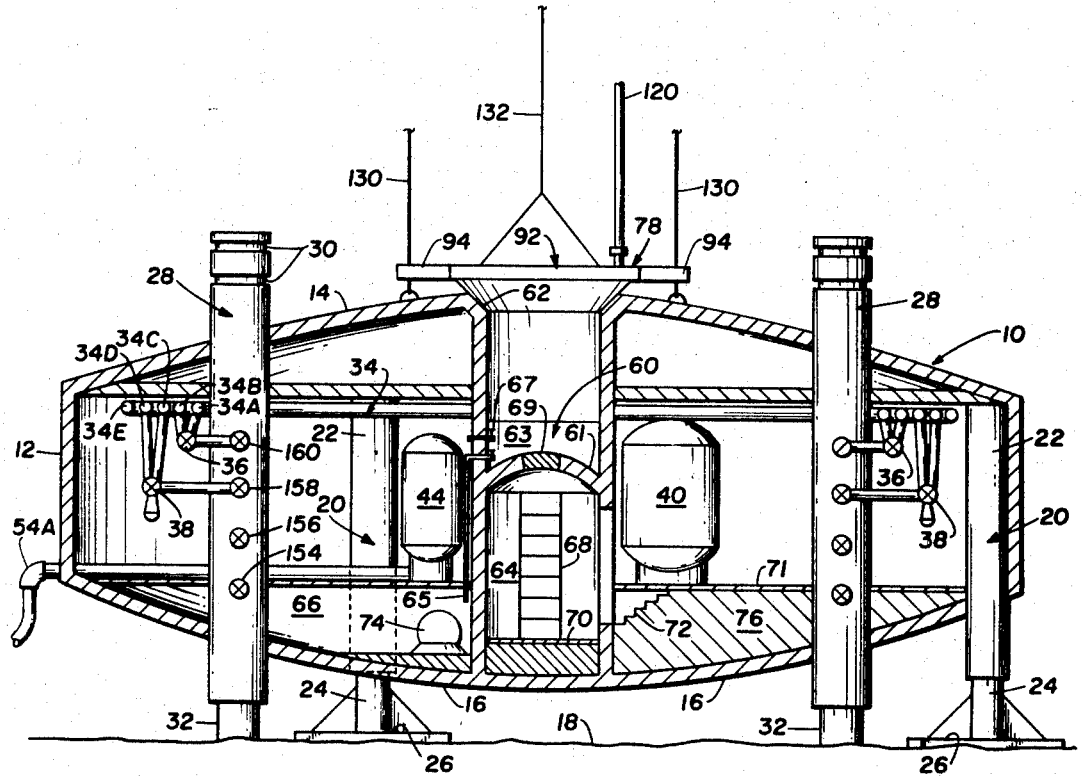
FIGURE 3 is a cross-sectional view of the subsea satellite taken through line 3—3 of FIGURE 2, with certain elements omitted for clarity, further illustrating the placement of the production apparatus within the satellite and the manner in which the personnel travel chamber is sealed into an access trunk extending vertically through the satellite.

FIGURES 2 and 3 show the interior of the subsea satellite 10, with FIGURE 2 showing, in particular, the placement of the leveling units 20, the wellhead cylinders 28, and the production equipment within the shell 12. The three leveling units 20 are arranged 120° apart in a circular pattern adjacent the cylindrical shell 12 to allow as much room inside the satellite 10 as possible for the production equipment, while the wellhead cylinders 28 are arranged in an inner circular pattern for accessibility. Storage bottles 29, containing nitrogen under high pressure, are stored along the walls of the satellite outward of the wellhead cylinders.

The wellhead cylinders 28 are tied into a circular manifold, generally designated 34, within the satellite 10, consisting of manifold lines 34A, 34B, 34C, and 34D. An auxiliary line 34E is also included in the circular manifold 34. Three-way, two-position valves 36 and 38 are connected to the production passages and the well annuli, respectively, of the wellhead cylinders 28 (FIGURE 3). The valve 36 of each wellhead cylinder, in a first position, connects the production passage of the respective well to a group separator 40 through the manifold line 34A and a group separator inlet line 42. In the second position of the valve 36, a test separator 44 is operatively connected to the production passage through the manifold line 34B and a test separator inlet line 46. The valve 38 of each wellhead cylinder connects the annulus of the respective well to a gas lift manifold line 34C. In the second position of the valve 38, the manifold line 34D, to be discussed later, is connected to the annulus of the well. A line 48 connects the outlets of the test separator 44 to the inlet of the group separator 40. The input side of a booster pump unit 50, adjacent the group separator 40, is connected thereto by the gas, oil, and water outlet lines 52A, 52B, and 52C, respectively. The output side of the booster pump unit 50 is connected to gas, oil, and water shipping lines 54A, 54B, and 54C, respectively, forming a part of a bundle of shipping lines, generally designated 54. While the booster pump unit 50 appears in schematic form as a single box, in actuality separate pumps or compressors would be required, one for each fluid, and each one would have to be driven by a separate variable speed drive, controlled by level or pressure sensors within the group separator 40. Shipping lines 54D and 54E carry dry gas and hydraulic oil from the storage facilities to the inlet of the booster pump 50 in the satellite. The outlets of the pump unit 50, connected to the dry gas and hydraulic oil shipping lines 54D and 54E, are connected to the manifold lines 34C and 34E by intermediate lines 55 and 57, respectively. A main electric power line 56 interconnects a power generator on a surface station with the satellitie through a control, alarm and data storage unit 58, operatively connnected to all of the electric motors used with the subsea equipment.

In a production run the group separator 40 receives production from all of the wellheads through the manifold line 34A and separates the production into gas, oil, and water. The three-way, two-position valve 36 on each of the wellheads 28 is sequentially actuated, for a short time, to rotate it from the first position, in which it allows the production to flow into the group separator 40, into the second position in which it allows the production of the particular wellhead to flow into the test separator 44 for sampling the gas-oil-water ratio. The group separator 40 receives the bulk of the produced three-phase fluid from the manifold line 34A and permanently divides it into gas, oil, and water, the gas to be either flared at the surface or transported to the central storage facilities. The oil and water are pumped separately to the storage facilities where the oil is stored in tanks and the water is treated to remove contaminants and then pumped out into the sea, or sent back to the satellite to be used in water injection wells. The booster pump unit 50 raises the pressure in the shipping lines 54A, B, and C, which transport the gas, oil, and water to the storage facilities, where necessary, i.e., where the storage facilities are on the surface. The outputs of the test separator 44 are recombined and then fed into the group separator 40 through the interconnecting line 48. However, in the appropriate case, the separate oil, gas, and water from the test separator 44 can be fed directly into the shipping lines 54A, B, and C of the group separator 40. The information derived from the test separator 44, by means such as positive displacement meters (not shown), is directed into the control, alarm, and data storage unit 58 (FIGURE 2).

During periodic inspections of the satellite 10, the information obtained from the test separator 44 and any other information gathering devices would be retrieved from the data storage portion of the unit 58. It is also feasible to continuously send the information to the surface as an electric signal through a cable, or instead store the information in the storage unit 58 until a release signal is received from the surface station. When personnel are not within the satellite it is advisable that rather than keeping breathable air within which could form an explosive mixture with any escaping gases, the breathable air be purged undiluted by flushing with the nitrogen kept within the satellite in the storage bottles 29. The nitrogen would itself be flushed and the satellite refilled with air when personnel are needed within the satellite 10.

The dry gas transported to the satellite through shipping line 54D can be injected into individual wells for gas lift procedures through the manifold line 34C and the two-position three-way valve 38. The manifold line 34D can be used for injecting other fluids as desired into the annuli of the wells. This may be packer fluids used to compensate for the hydrostatic pressure in a well or drilling mud to kill a well if this becomes necessary. Hydraulic oil may also be pumped down the well to power Kobe subsurface pumps (not shown). Workover fluids injected into the production tubing may be recirculated through the annulus, the manifold 34, and via a line from the satellite to the surface facilities, to reconditioning tanks at the source of the fluid. The high pressure hydraulic oil in the manifold line 34E can be tapped at points around the satellite to operate the appropriate hydraulic motors and controls.

The equipment is generally arranged around a central cylindrical access trunk 60 extending vertically through the satellite 10. The access trunk is partitioned by an arched, pressure-resistant bulkhead 61 into an upper travel chamber receiving portion 63, open to the sea through a coextentive aperture in the upper spherical head 14 of the satellite shell, and a lower or intermediate portion 64, closed off by the lower spherical head 16 of the satellite shell. A conical bevel 62 is formed at the intersection of the access trunk 60 and the upper spherical head 14 of the satellite 10. A valved drain line 65 connects a point in the upper portion 63 of the trunk 60, just above the bulkhead 61, with a waste sump 66 formed in a concreate ballast portion 76 in the lower end of the shell of the satellite 10. A further valved conduit 67 interconnects the upper portion 63 of the access trunk 60 with the interior of the satellite 10. A ladder 68 extends from a central sealable port or hatch 69 in the arched bulkhead 61 to a lower flooring or deck 70 of the access trunk 60. The lower deck or floor 70 of the access trunk is connected with an upper working deck 71 within the interior production area of the satellite surrounding the access trunk by a flight of stairs 72. A sump pump 74 is mounted in the satellite interior beneath the deck 71 in the waste sump area 66.

Figure 4:
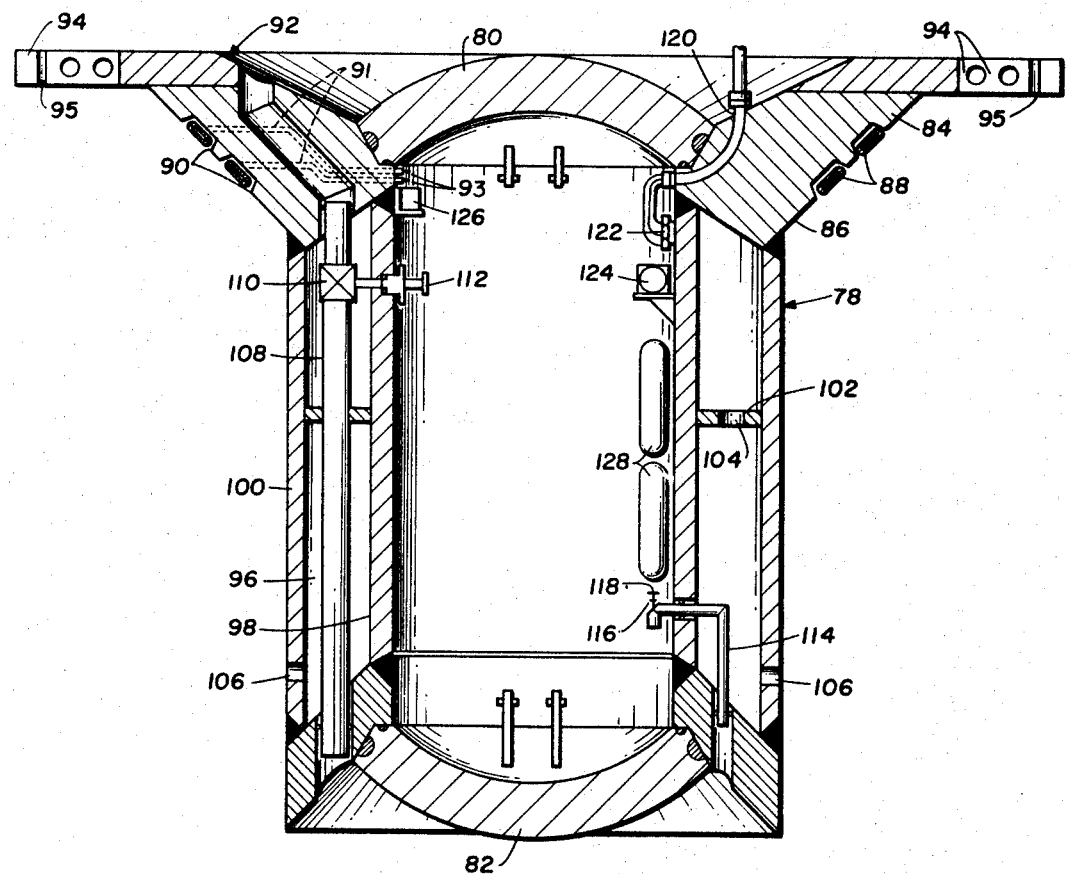
FIGURE 4 is a cross-sectional view of the personnel travel chamber shown in FIGURE 3.

A travel chamber, generally designated 78, for transporting servicing personnel to the subsea satillite (FIGURE 4), is constructed as a double-hulled cylinder with hinged spherical upper and lower ends or hatches 80 and 82, respectively, and a circumferential flange section 84, with a lower conically beveled face 86, fixed to the upper end thereof. A pair of inflatable sealing rings 88 are cemented within concentric circumferential grooves 90 in the lower face 86 and are connected by air passages 91, extending through the flange section 84, with releasable pressure fitting 93 mounted inside the chamber for inflating the rings 88 from within. In the alternative, elastically deformable solid sealing rings could be used. A hoisting yoke 92, comprising of a pair of diametrically opposed guide arms 94, is rigidly fixed to the upper horizontal face of the flange section 84. A guide aperture 95 extends through the outer end of each guide arm 94. An integral buoyancy tank 96, formed between the inner cylindrical hull 98 and the outer cylindrical hull 100, is divided into upper and lower sections by a stiffening ring 102 which has a plurality of interconnecting ports 104 extending therethrough. Buoyancy tank blowdown ports 106 are formed through the outer hull 100 at the lower end thereof. A bypass line 108 extends through the integral buoyancy tank 96, between the inner and outer hulls 98 and 100, respectively, to interconnect the areas above the upper end 80 and below the lower end 82 of the travel chamber 78 through a shutoff valve 110 controlled by a hand actuator 112 situated within the inner hull 98. A pressure relief line 114 interconnects the interior of the inner hull 98 with the area below the lower end 82 of the travel chamber 78. The pressure relief line also has a shutoff valve 116 controlled by a hand actuator 118 located within the inner hull 98. Electric lines and air lines extend from the surface station into the travel chamber 78, entering by means of a sealed conduit 120, passing through the flange section 84 into the interior of the inner hull 98. The electric lines are connected within the inner hull 98, to a control panel and switchboard 122 for controlling the necessary apparatus connected with the travel chamber 78. Also within the travel chamber 78 are a high pressure bilge pump 124, a group of axiliary storage batteries 126, and compressed air bottles 128.

Looking back to FIGURE 3 it may be seen that a pair of tensioned guide lines 130 extend upwardly from the satellite's spherical head 14, on either side of the access trunk 60. The apertures 95 (FIGURE 4) extending through the guide arms 94 of the hoisting yoke 92 are slidably entrained over these guide lines 130. Furthermore, a hoisting cable 132 is connected to the upper end of the travel chamber 78 and extends from there up to the surface station. With the travel chamber 78 settled in the upper portion 63 of the access trunk 60, the bulkhead 61 must be far enough below the lower end of the chamber to provide clearance for the two hinged hatches (the lower hatch 82 of the travel chamber and the hatch 69 in the access trunk bulkhead 61) to permit the two to clear each other when opening. The conduit 67, interconnecting the upper portion 63 of the access trunk 60 with the interior of the satellite 10, must be located so as to extend into the access trunk 60 below the lower end of the travel chamber 78 when the travel chamber is firmly seated in the trunk.

The travel chamber 78 is conducted from the surface station to the satellite 10, at the bottom, on the guide lines 130 which are connected at their upper ends to points on the surface station. The travel chamber 78 is conveyed from the satellite 10 to the surface station by means of the hoisting cable 132, although it is contemplated that the integral buoyancy tank 96 would play a large part in alleviating the strain on the cable. It is brought to the reader's attention that the upper removable end 80 serves as a hatch and is used to permit personnel to enter or leave the travel chamber 78 at the upper end of its journey without the necessity of lifting the travel chamber completely out of the water. By completely filling the buoyancy tank 96 with air from the compressed air tanks 128 and expelling the water therefrom, the chamber can be caused to rise quickly to the surface in an emergency. The compressed air can also be used to supply breathable air within the inner hull 98 if the air hose to the surface becomes crimped or severed. By filling the buoyancy tank 96 with water, through the ports 106, the travel chamber 78 can be caused to descend back to the satellite 10 from the surface. The storage batteries 126 are also an emergency device, designed to take over if the electrical power delivered through the interconnecting electrical lines should fail or these lines be severed. As the travel chamber descends along the guide lines 130, into position within the access trunk 60, the sealing rings 88, set in the lower conically beveled face 86 of the flange section 84 on the upper end of the travel chamber 78, coact with the conical bevel 62 at the upper end of the access trunk 60 to seal the trunk at its upper end, the sealing rings 88 being inflated from within the travel chamber to permit them to conform more readily to and seal around any roughness in the mating surfaces. The bypass valve 110, controlling the bypass line 108, is held in an open position at this time so that as the chamber 78 settles into the access trunk 60 the displaced water can escape.

After the travel chamber is landed in the access trunk and is presumably sealed tight against the upper end of the access trunk 60, the bypass valve 110 would be closed. With the only water in the access trunk 60 being that under and around the travel chamber, and inasmuch as water is relatively incompressible, a quick opening of pressure relief valve 116 from within the travel chamber would immediately reduce the water pressure in the access trunk to the pressure existing in the travel chamber, if the travel chamber sealing rings 88 are sealing properly. If water continues to flow through the valve 116, the presumption is that the sealing rings 88 are not holding and efforts to correct this must be made before the travel chamber lower hatch can be opened. In any event, it will be well nigh impossible to open the travel chamber lower hatch 82 until the pressure is equalized on both sides of it, i.e., the pressure below it brought to atmospheric, as that is the usual pressure within the travel chamber 78. The valved drain line 65 is operated by the personnel in the travel chamber 78, after they have opened the lower hatch 82, to drain the residual water trapped above the access trunk bulkhead 61. The sump pump 74 beneath the working deck 68 automatically controls the depth of the waste water within the sump or bilge section 66 and so would evacuate the residual water being dumped through the drain line 65.

The valved conduit 67 would be used by personnel within the travel chamber, after the bottom hatch 82 of the travel chamber 78 is opened, as a connection for a pressure gauge to check the internal pressure within the satelwill undoubtedly be an indication of the satellite internal pressure transmitted to the surface production facility servicing the production satellite, but the gauge check would be made as a necessary precaution. The same or another connection could be used by the personnel in the travel chamber 78 to sample the atmosphere within the satellite 10 for combustible or deleterious gases before the lower hatch 69 into the satellite 10 is opened and the personnel enter therein.

Figure 5:
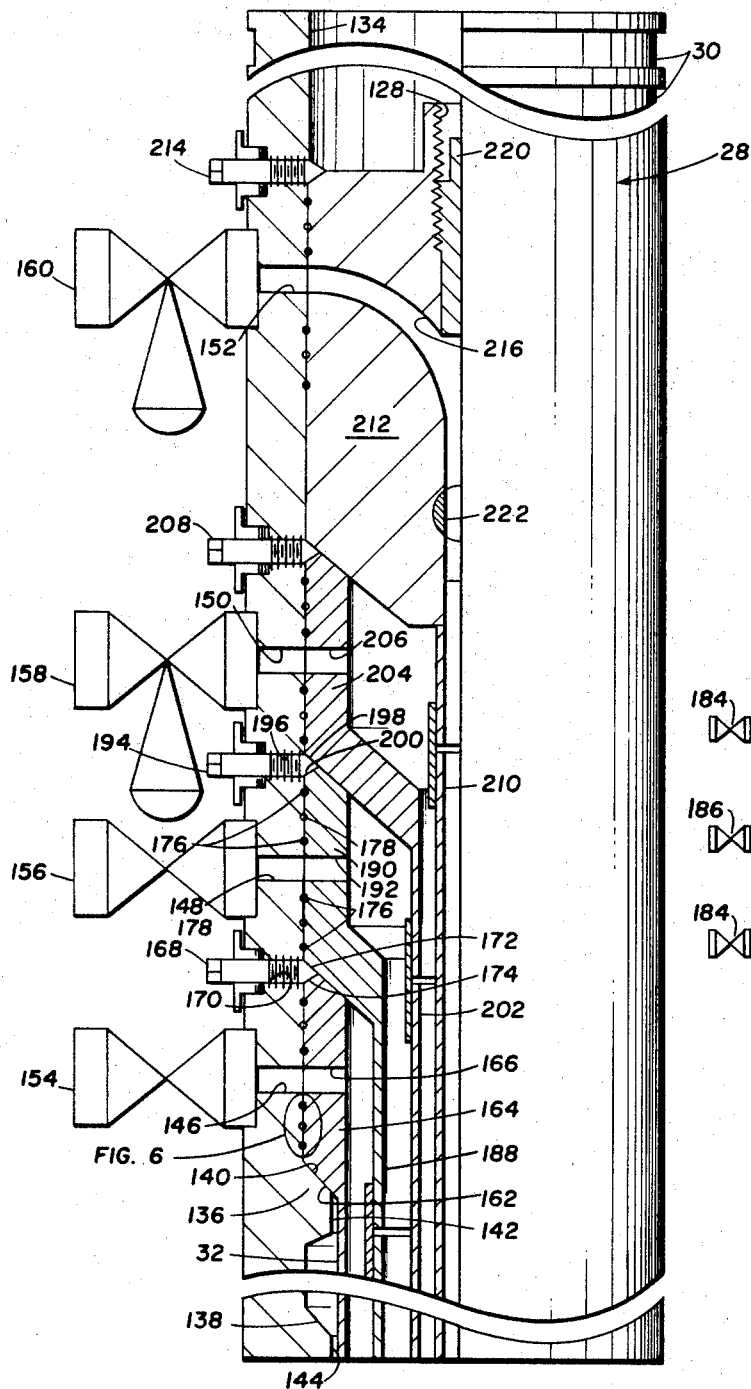
FIGURE 5 is a cross-sectional view through one of the satellite wellhead cylinders of the invention taken through line 5—5 of FIGURE 2.

One of the novel wellhead cylinders 28 will now be described in conjunction with FIGURE 5 to bring out in detail the features which allow the wellhead to be placed on the bottom before the respective well is drilled. The exemplary wellhead 28, as illustrated, is adaptable for a concentric dual completion and the later-to-be-discussed procedure for assemblying the well casings and tubing in the wellhead 28, and the subaqueous well bore, will be directed to just such a completion. A concentric passage 134 through the wellhead cylinder 28 is relieved only by a pair of internal circumferential flanges 136 and 138. The flange 136 is centrally located in the passage 134 within the satellite shell 12. It has a machined upper beveled face 140 and a machined cylindrical inner periphery 142, concentric with the passage 134 through the wellhead cylinder 28. The lower flange 138 of the pair of internal circumferential flanges located below the satellite 12 in the passage 134, has a concentrically machined inner periphery 144 only. Radial ports 146 through 152, for operatively connecting the central passage 134 with the outer periphery of the wellhead cylinder 28, are spaced along the axial length thereof, within the satellite 10. Valves 154 through 160 are connected to the outlets of the ports 146 through 152, respectively.

The conductor pipe 32, with an enlarged mandrel head 164, extends into the marine bottom 18 through the wellhead cylinder 28. The mandrel head 164 has a lower tapered face 162 for locating the conductor pipe 32 on the upper machined face 140 of the circumferential flange 136 within the central passage 134. The conductor pipe mandrel head 164 also has a radial portion 166 therethrough which registers with the lowermost port 146 in the wellhead cylinder, when the conductor pipe is in place as shown. The mandrel head is clamped rigidly in place by a mandrel lock screw 168, threaded through a radial hole 170 in the wellhead cylinder 28 with the shaped end 172 thereof engaging an outer machined bevel 174 on the upper, inward conically tapered face of the mandrel head 164.

Figure 6:
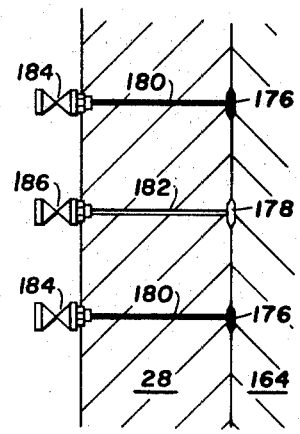
FIGURE 6 is a fragmentary view of the porting arrangement for cementing the conductor pipe, the casings, and the tubing in the wellhead cylinder of FIGURE 5.

Composite packing grooves 176 and a composite inspection groove 178 are formed between the wellhead cylinder 28 and the mandrel head 164 by circumferential groove portions in the wall of the central passage 134, in the wellhead cylinder 28, and the cylindrical matching surface of the mandrel head 164. As shown clearly in FIGURE 6, radial packing and inspection ports 180 and 182, respectively, extend through the wellhead cylinder 28 from the respective grooves 176 and 178 to the periphery of the wellhead cylinder. The ports 180 and 182 are closed at their outer ends by automatic check valves 184 and 186.

An outer casing 188 sets in the wellhead cylinder 28 above the conductor pipe 32 with an enlarged mandrel head 190 thereof seated on the upper end of the conductor pipe mandrel head 164. A pair of complementary conical surfaces are formed in the upper end of the conductor pipe mandrel head 164 and on the lower end of the outer casing mandrel head 190 to properly locate and seat the outer casing 188. A radial port 192 in the outer casing head 190 registers with the radial port 148 in the wellhead cylinder 28 when the outer casing 188 is in place as shown. The outer casing mandrel head 190 is also clamped rigidly in place by a mandrel lock screw 194, threaded through a hole 196 in the wellhead cylinder 28, and having a shaped outer end 198 bearing on an outer matching bevel 200 on the upper end of the casing mandrel head 190. Composite packing and inspection grooves 176 and 178, respectively, are formed by matching groove portions in the outer surface of the mandrel head 190 and the wall of the passage 134 in the wellhead cylinder 28.

A second, inner casing 202 is set in the wellhead cylinder 28 with an enlarged mandrel head 204 thereof seated on the upper end of the mandrel head 190 of the outer casing. To properly seat the mandrel head 204 of the inner casing 202 in the wellhead cylinder passage 134, a pair of complementary conical surfaces are formed in the upper end of the mandrel head 190 of the outer casing 188 and on the lower end of the mandrel head 204 of the inner casing 202. The mandrel head 204 is also clamped in place by mandrel lock screw 208 as described with respect to the mandrel heads of the outer casing 188 and the conductor pipe 32. A radial port 206, extending through the mandrel head 204, registers with the radial port 150 in the wellhead cylinder wall. Composite packing and inspection grooves 176 and 178, respectively, are also present between the outer surface of the mandrel head 204 and the wall of the passage 134 in the wellhead cylinder 28.

A string of production tubing 210 having an upper enlarged mandrel head 212 extends through the inner casing 202. The mandrel head 212 is seated on the upper end of the mandrel head 204 of the inner casing 202 by conical bearing surfaces in the same manner that the mandrel head 204 of the inner casing 202 sets on the mandrel head 190 of the outer casing 188, and the mandrel head 190 of the outer casing 188 sets on the mandrel head 164 of the conductor pipe 32. The tubing mandrel head 212 is also clamped rigidly in place by a mandrel screw 214. A port 216 extending through the mandrel head 212 registers with the radial port 152 in the wellhead cylinder wall. A central passage 218, through the mandrel head 212, is closed at its upper end, above the interconnecting port 216, by a retrievable mandrel plug 220. Also within the central passage 218 of the mandrel head 212, but below the port 216, is a hydraulically operated ball master valve 222.

It will now be shown how a satellite with integral wellhead cylinders 28 can be set on the bottom of the sea prior to the drilling of the well, while in the prior art the various elements of the wellhead and christmas tree are installed while the well is being drilled and after it has been completed. First, the satellite 10 is set on the marine bottom 18, supported by the platelike feet 26 of the leveling units 20, which prevent the satellite 10 from sinking into unconsolidated muds or sands which may form the bottom 18 in some areas. During installation, the wellhead cylinder valves 154 through 160 must remain closed to keep the water out of the interior of the satellite. Next, air or oil under pressure is introduced into one or more of the leveling units 20 to extend the respective unit to the desired length to level the satellite prior to the drilling of any wells therethrough. A conductor pipe 32 is hammered, jetted, or drilled through one of the vertical wellhead cylinders 28 until the lower conical end of the mandrel head 164 of the conductor pipe 32 rests on the upper machined face 140 of the upper flange 136. The machined inner peripheries 142 and 144 of the flanges 136 and 138 merely act to keep the conductor pipe 32 aligned in the wellhead cylinder. Once the conductor pipe 32 is in place within the wellhead cylinder 28, the mnadrel lock screw 168 is threaded through the hole 170 in the wall of the wellhead cylinder 28 and into contact with the bevel 174 on the upper end of the mandrel head 164 to hold it in place. A sealant such as some type of plastic packing or cement is then injected into the packing ports 180 to seal the mandrel head 164 into the wellhead cylinder 28 and to prevent leakage from the composite radial ports 146, 166, by temporarily connecting each of the check valves 184 at the outer ends of the packing ports 180 to a device similar to a high pressure manually operated grease gun to inject the packing. Once the packing has been injected into both packing grooves 176, test groove 178 is pressure tested by a manually operated hydraulic pump to see if the mandrel head 164 is adequately sealed in the wellhead cylinder. As an alternative, the check valve 184 can be connected to a grout injection line (not shown) of the manifold 34 (FIGURES 2 and 3). These last two steps are to be performed by personnel who would either be stationed within the satellite 10 during the entire drilling operation or would go into the satellite only when some specific operation is to be performed, as, for example, locking and sealing a casing mandrel in place. After cementing at least the three conductor pipes 32 opposite the three leveling units 20 in place, the leveling units 20 are no longer needed and may be withdrawn.

If the wells are to be drilled from a bottom-supported above-surface platform, a riser (not shown) is now connected by remote locking means, through the machined grooves 30 to the upper end of the wellhead cylinder 28 to connect operatively the conductor pipe 32 to a point above the surface, and a BOP (not shown) is installed on the upper end of the riser, at the level of the drilling deck of the drilling unit. If the well is to be drilled from a floating drilling unit, the BOP is connected by remote locking means, through the machined grooves 30, to the upper end of the wellhead cylinder 28, and the riser is connected to the upper end of the BOP, also by remote locking means, to connect operatively the conductor pipe 32 to a point above the surface. In either case, drilling commences through the BOP, the riser, and the conductor pipe (not necessarily in that order) and continues until an intermediate depth is reached. The drilling procedure is generally similar to that used with onshore wells. While normally the drilling mud that is pumped down through the drill string returns through the annulus between the riser and the drill stem, it is a possibility that buckling of the riser under the mud load may make it advantageous instead to draw off the mud through one of the valves 154 or 156 (with the riser above the valve packed off). Such a procedure would require much larger side outlet connections and valves than would normally be provided.

After drilling to a predetermined depth, the outer casing 188 is inserted by a releasable well tool (not shown), through the riser and into the wellhead cylinder 28, and landed on the tapered upper face of the conductor pipe mandrel head 164. The mandrel head 190 of the outer casing 188 is clamped tightly in place by the mandrel screw 194 by personnel within the satellite 10 and sealed in the wellhead cylinder 28 as was the conductor pipe 32. The outer casing 188 is then cemented into the underlying formations by pumping grout down therethrough through the string of pipe (not shown) used to set the outer casing 188 in the wellhead 28. During the cementing operations, the drilling mud returns would have to be taken off from the wellhead cylinder through the side outlet valve 154 and conducted back to the drilling unit, either through a line of the manifold 34 and then by an external hose from the satellite to the drilling unit, or by reinjecting the returns through the upper side outlet valves 156, 158, or 160 or the wellhead above the mandrel head 190 and thereby returning mud to the drilling unit through the riser to the surface. In any event, for all subsequent strings of casing run, the cementing operation would be conducted in the normal manner, i.e., by pumping the cement slurry down the inside of the casing to be cemented, around the bottom or shoe joint and up the annulus between the casing and the walls of the hole or the bore of the next larger size of casing run. Only in the case of cementing the outer string of casing 188 would the returns be brought all the way to the surface.

The inner casing 202 is inserted into the wellhead cylinder 28 in the same manner as was the outer casing 188. The procedure discussed above is followed for rigidly clamping this casing in place and sealing it to the wellhead cylinder 28.

The production tubing 210 is set in place in the wellhead cylinder within the inner casing 202. The mandrel head 212 thereof is also clamped tightly into the wellhead cylinder by the mandrel screw 216 and sealed to the wellhead cylinder 28 through the group of packing ports 180. The mandrel plug 220 is fixed in the mandrel head 212 of the tubing 210 either before the tubing is inserted into the wellhead cylinder 28 or shortly thereafter. The riser and the BOP can be removed at any time after the upper end of the cylinder is closed by the mandrel head plug 220 being threaded into the mandrel head 212.

The well is now ready to go on stream through the production facilities in the satellite 10. If, at a particular well, two producible zones are found which it is desired to produce simultaneously, the annulus between the tubing 210 and the inner casing 202 would carry the production from the upper zone, and the tubing 210 would carry the production from the lower zone. The annulus between the inner casing 202 and the outer casing 188 would then serve as the well annulus. For a dual completion of the type described here, there would be two three-way valves 36 for the well, both connected through manifolds 34A and 34B to separators 40 and 44, with one three-way valve 36 connected to wellhead side outlet valve 160 for production from the tubing 210 and one three-way valve 36 connected to wellhead side outlet valve 158 for production through the annulus. The three-way valve 38 would be connected to wellhead side outlet valve 156 rather than wellhead side outlet valve 158.

Although the present invention has been described in connection with details of the specific embodiments thereof, it is to be understood that such details are not intended to limit the scope of the invention. The terms and expressions employed are used in a descriptive and not a limiting sense and there is no intention of excluding such equivalents, in the invention described, as follow in the scope of the claims. Now having described the apparatus herein disclosed, reference should be had to the claims which follow.

What is claimed is:

1. A subsea production satellite for producing fluid mineral deposits from at least one subaqueous well completed beneath the surface of a body of water, said satellite comprising a hollow pressure-resistant watertight shell, a plurality of integral wellhead cylinders vertically intersecting said shell and being rigidly connected and sealed thereto at the intersections, a central passage extending completely through each of said wellhead cylinders, a first port connecting at least one of said central passages with the watertight interior of said satellite shell, a valve within said satellite shell operatively connected to said first port to close selectively said first port between said one central passage and said interior of said satellite shell whereby the satellite can be submerged prior to drilling a well and the interior of said satellite shell can remain watertight by closing said first port although said one central passage is open at the ends thereof.

2. A subsea production system including the subsea satellite of claim 1 installed beneath the surface of a body of water, a locating flange in said one central passage, a first hollow pipe situated in said one central passage and extending into the formations beneath the marine bottom, a locating means near the upper end of said first hollow pipe abutting said locating flange in said one central passage whereby said first hollow pipe is longitudinally located in said one central passage when said first hollow pipe is lowered into said one central passage from a drilling station above the surface of said body of water.

3. The subsea production system of claim 2 wherein there is at least one composite packing groove formed in part in the wall defining said one central passage, and in part in the upper end of said first hollow pipe within said one central passage, at least one packing port bridging the wall of said wellhead cylinder through which said one central passage extends to connect said composite groove with said interior of said satellite shell outside of said wellhead cylinders, and means within said satellite shell for selectively closing said packing port whereby a fluidtight connection is effected between the outside of said first hollow pipe and the wall of said one central passage by injecting a sealing material through said packing port under the control of personnel within said satellite.

4. The subsea production system of claim 2 wherein there is a port bridging the wall of said first hollow pipe, said port bridging said wall of said first hollow pipe being in register with said first port connecting said one central passage with said watertight interior of said satellite shell to form a first composite port when said first hollow pipe is located in said one central passage, and means for plugging the upper end of said one central passage whereby a closed fluid path is formed from said subaqueous well into the interior of said satellite shell outside of said respective wellhead cylinder through said respective wellhead cylinder and said first composite port.

5. The subsea production system of claim 2 wherein there is means actuated from within the interior of said satellite shell for clamping the upper end of said first hollow pipe down against said locating flange within said one central passage whereby said first pipe is held securely in place within said one central passage.

6. The subsea production system of claim 2 wherein there is a second hollow pipe, said second hollow pipe having an upper enlarged head or mandrel and a lower elongated pipe section, said enlarged head of said second hollow pipe fitting into said one central passage above said first pipe and said elongated pipe section of said second hollow pipe being coaxially arranged within said first pipe and extending down into a well therebeneath, a locating surface on the upper end of said first pipe locating said second hollow pipe axially within said one central passage in conjunction with a locating surface on the lower end of said second enlarged head, a port extending through said enlarged head of said second hollow pipe, said port in said second enlarged head and a second port connecting said one central passage with the watertight interior of said satellite shell being in register to form a second composite port when said second hollow pipe is correctly located in said respective wellhead cylinder, and means for plugging the upper end of said one central passage above said second composite port whereby a fluid path is formed from a well beneath said wellhead, through said second hollow pipe, and said second composite port, into the interior of said satellite surrounding said wellhead cylinder.

7. The subsea production system of claim 2 wherein there are a plurality of coaxial hollow pipes within said first hollow pipe within said one central passage, said plurality of hollow pipes including an innermost hollow pipe and at least one intermediate hollow pipe, each of said plurality of hollow pipes having an upper enlarged head or mandrel and a lower elongated pipe section, said enlarged heads of said plurality of hollow pipes fitting into said one central passage above said first pipe, said lower elongated pipe sections of said plurality of hollow pipes being coaxially arranged within said first hollow pipe forming annuli between adjacent lower elongated pipe sections, an upper locating surface on the upper end of said first hollow pipe and the upper ends of said enlarged heads of each of said intermediate hollow pipes, each upper locating surface longitudinally locating said enlarged head of the one of said plurality of hollow pipes directy thereabove in conjunction with an abutting locating surface on the lower end of the said enlarged head of said one of said plurality of said hollow pipes, a plurality of ports connecting said one central passage with said watertight interior of said satellite shell, a port bridging each of said enlarged heads of said plurality of hollow pipes, each of said plurality of ports connecting said one central passage with said watertight interior of said satellite shell being in register with a port bridging one of said enlarged heads of said plurality of hollow pipes forming a plurality of composite ports when said plurality of hollow pipes are correctly situated in said one central passage, and means for plugging the upper end of said one central passage above said plurality of said composite ports whereby a fluid path is formed through each of said annuli and said innermost hollow pipe into said interior of said satellite shell surrounding said plurality of wellhead cylinders, including said respective wellhead cylinder through which said one central passage extends, through the respective composite port.

8. A subsea production satellite system comprising the subsea production satellite as recited in claim 1 wherein said satellite shell is supported by the marine bottom directly over the uppermost end of said subaqueous well, said respective wellhead cylinder being operatively connected to said subaqueous well, well production equipment located within said watertight shell of said satellite in an atmosphere less deleterious than the water outside of the satellite, said first port being connected to said well production equipment through said valve within said shell of said satellite selectively controlling fluid flow between said one central passage through said respective wellhead cylinder and said well production equipment within said satellite shell whereby personnel within said satellite shell can control said fluid flow.

9. The subsea production satellite system of claim 8 wherein said means operatively connecting said respective wellhead cylinder to said subaqueous well is a well conductor pipe bridging the space between said respective wellhead cylinder and said uppermost end of said subaqueous well therebeneath, said satellite shell being rigidly fixed with respect to said marine bottom by said respective wellhead cylinder fixed to said satellite shell at least at said intersections with said shell and said respective wellhead cylinder being rigidly fixed to said conductor pipe which is anchored in said marine bottom within said subaqueous well.

10. The subsea production satellite system of claim 8 wherein a plurality of subaqueous wells extend beneath said satellite, each of said wells being completed through one of said wellhead cylinders intersecting said watertight shell of said satellite, means for operatively connecting said central passages through each of said wellhead cylinders and said well production equipment within said satellite shell, whereby various production process steps may be performed on the combined production of said plurality of wells.

11. The subsea production satellite system of claim 10 wherein said wellhead cylinders extend through said satellite shell in a substantially circular configuration surrounding said well production equipment.

12. The subsea production satellite system of claim 10 wherein said subaqueous wells, operatively connected to said satellite through said rigid wellhead cylinders and said bridging conductor pipes, diverge downwardly to produce from a large portion of an underground fluid mineral deposit.

13. The subsea production satellite of claim 1 wherein there is a locating flange in said one central passage in said respective wellhead cylinder for abutting a locating means near the upper end of a first hollow pipe to be situated in said one central passage and extend into the upper end of a subaqueous well therebeneath, said locating flange in said one central passage being adapted to locate and support longitudinally said first hollow pipe in said central passage of said wellhead cylinder when said first hollow pipe is lowered into said one central passage from a drilling station above the surface of said body of water.

14. The subsea production satellite of claim 13 wherein there is at least one packing groove portion formed in the wall defining said one central passage and adapted to be matched to a packing groove portion formed in the upper end of said first hollow pipe to be located within said one central passage to form a composite packing groove, at least one packing port bridging the wall of said respective wellhead cylinder to connect said packing groove portion in the wall defining said one central passage with said interior of said satellite shell outside of said wellhead cylinders, and means within said satellite shell for selectively closing said packing port whereby a fluidtight connection can be effected between the outside of said first hollow pipe and the wall of said one central passage, when said first hollow pipe is located in said central passage and a composite packing groove is formed, by injecting a sealing material through said packing port under the control of personnel within said satellite shell.

15. The subsea production satellite of claim 13 wherein there is means actuatable from within the interior of said satellite shell for clamping the upper end of said first hollow pipe down against said locating flange within said one central passage, when said first hollow pipe is located in said one central passage, whereby said first pipe is held securely in place within said one central passage in said respective wellhead cylinder.

16. A subsea production satellite as recited in claim 1 wherein there is well production equipment located within said watertight shell of said satellite, said valve within said shell of said satellite being connected between said first port and said well production equipment for selectively controlling fluid flow between said one central passage through said respective wellhead cylinder and said well production equipment within said satellite shell whereby personnel within said satellite shell can control said fluid flow.

17. The subsea production satellite of claim 16 wherein there is a means for operatively connecting the central passages extending through each of said wellhead cylinders and said well production equipment within said satellite shell, whereby various production process steps may be performed on the combined production of a plurality of subaqueous wells to be completed through said satellite shell.

18. The subsea production satellite of claim 17 wherein said wellhead cylinders extend through said satellite shell in a substantially circular configuration surrounding said well production equipment.

19. A method for installing a subsea production satellite system for producing fluid mineral deposits from at least one subaqueous well completed beneath the surface of a body of water, without divers, by utilizing personnel on a surface station and within the satellite, comprising the following steps:
(a) supporting said satellite on the bottom of a body of water above a subterranean formation bearing said fluid mineral deposits, said satellite comprising a hollow pressure-resistant watertight shell, well production equipment located within said watertight shell of said satellite, a plurality of integral wellhead cylinders vertically intersecting said satellite shell and being rigidly connected and sealed thereto at the intersections, a central passage extending completely through each of said wellhead cylinders, a first port connecting at least one of said central passages within the watertight interior of said satellite shell, a valve within said satellite shell operatively connected to said first port, said valve being in the closed position;
(b) providing a breathable atmosphere in said satellite shell;
(c) manning said satellite with said personnel to help in the installation of said satellite system;
(d) drilling said subaqueous well into said subterranean formation through said one central passage of the respective wellhead cylinder from said surface station;
(e) completing said subaqueous well, including hanging at least one casing and one tubing string in said respective wellhead cylinder from said surface station so that said valve is in fluid connection with the interior of said tubing string for producing said fluid minerals through said valve; and
(f) connecting the outlet of said valve to said well production equipment within said satellite shell and opening said valve to produce fluid minerals from said subaqueous well through said valve and into said well production equipment within said satellite shell.

20. The method for installing a subsea production satellite system as recited in claim 19 wherein there is leveling means partially mounted within said satellite shell and depending through said lower portion of said shell thereof comprising the following step:
(h) leveling said satellite by said personnel within said satellite shell actuating said leveling means so that the longitudinal axis of said wellhead cylinders are vertically oriented prior to drilling therethrough.

21. The method for installing a subsea production satellite as recited in claim 19 wherein the completion of said subaqueous well includes the following additional step:
(i) locking said casing and said tubing string in place within said respective wellhead cylinder by personnel within said satellite shell.

22. The method for installing a subsea production satellite as recited in claim 33 comprising the following additional step:
(g) setting a well conductor pipe into said subterranean formation underlying said bottom through said respective wellhead cylinder from said surface station by lowering said conductor pipe through said respective wellhead cylinder until the upper end of said well conductor pipe is supported on a locating flange in said respective wellhead cylinder.

23. The method for installing a subsea production satellite as recited in claim 22, comprising the following additional step:
(j) locking the upper end of said well conductor pipe in place in said respective wellhead cylinder by personnel within said satellite shell.

References Cited
UNITED STATES PATENTS

| | | | |
|---|---|---|---|
| 2,079,689 | 5/1937 | Gorton | 178—1 |
| 2,294,296 | 8/1942 | Hansen | 114—.5 |
| 3,063,507 | 11/1962 | O'Neill et al. | 166—.5 |
| 3,095,048 | 6/1963 | O'Neill et al. | 175—.6 |
| 3,202,216 | 8/1965 | Watts et al. | 166—.6 |
| 3,202,217 | 8/1965 | Watts et al. | 166—.6 |
| 3,294,185 | 12/1966 | O'Neill et al. | 166—.5 |
| 3,353,364 | 11/1967 | Blanding et al. | 61—69 |

FOREIGN PATENTS

| | | |
|---|---|---|
| 160,865 | 4/1921 | Great Britain. |

JAMES A. LEPPINK, *Primary Examiner.*

UNITED STATES PATENT OFFICE
CERTIFICATE OF CORRECTION

Patent No. 3,391,734                                   July 9, 1968

Robert D. Townsend, Jr.

It is certified that error appears in the above identified patent and that said Letters Patent are hereby corrected as shown below:

Column 1, lines 44 to 49, beginning with "For purposes of this" cancel all to and including "well and/or flowlines.". Column 2, line 7 is inverted and should read -- where a bottom-supported platform must be built to with- --. Column 6, line 3, "satellitie" should read -- satellite --. Column 7, line 1, "coextentive" should read -- coextensive --; line 22, "satillite" should read -- satellite --; line 34, cancel "of"; line 62, "axiliary" should read -- auxiliary --. Column 8, line 75, "satel-" should read -- satellite before the hatch 69 into the latter is opened. There --. Column 9, line 40, "portion" should read -- port --. Column 10, line 65, "mnadrel" should read -- mandrel --. Column 11, line 61, "or", second occurrence, should read -- of --. Column 15, line 66, "within" should read -- with --. Column 16, line 38, claim reference numeral "33" should read -- 19 --.

Signed and sealed this 25th day of November 1969.

(SEAL)
Attest:

EDWARD M. FLETCHER, JR.                      WILLIAM E. SCHUYLER, JR.
Attesting Officer                                Commissioner of Patents